United States Patent
Bassi et al.

(10) Patent No.: US 9,242,678 B2
(45) Date of Patent: Jan. 26, 2016

(54) AUTOMOBILE BODY PART (71) Applicant: Novelis Inc., Atlanta, GA (US)

(72) Inventors: Corrado Bassi, Salgesch (CH); Juergen Timm, Steisslingen (DE)

(73) Assignee: Novelis Inc., Atlanta, GA (US)

( * ) Notice: Subject to any disclaimer, the term of this patent is extended or adjusted under 35 U.S.C. 154(b) by 0 days.

(21) Appl. No.: 14/027,718

(22) Filed: Sep. 16, 2013

(65) Prior Publication Data

US 2014/0035323 A1 Feb. 6, 2014

Related U.S. Application Data

(60) Continuation of application No. 13/467,328, filed on May 9, 2012, now Pat. No. 9,085,328, which is a division of application No. 12/703,538, filed on Feb. 10, 2010, now abandoned, which is a continuation of application No. 10/578,985, filed as application No. PCT/EP2004/013233 on Nov. 22, 2004, now abandoned.

(30) Foreign Application Priority Data

Nov. 20, 2003 (EP) ..................................... 03405826

(51) Int. Cl.
*C22C 21/08* (2006.01)
*B62D 25/10* (2006.01)
(Continued)

(52) U.S. Cl.
CPC .............. *B62D 25/105* (2013.01); *B62D 25/08* (2013.01); *B62D 25/082* (2013.01); *B62D 25/12* (2013.01);
(Continued)

(58) Field of Classification Search
CPC ....... C22C 21/08; B62D 25/105; B62D 25/08
See application file for complete search history.

(56) References Cited

U.S. PATENT DOCUMENTS 1,911,080 A 5/1933 Keller et al.
3,177,073 A 4/1965 Foerster
(Continued)

FOREIGN PATENT DOCUMENTS

| CA | 2363116 | 9/2000 |
|---|---|---|
| DE | 2735473 | 2/1978 |

(Continued)

OTHER PUBLICATIONS

RJ Bucci, G. Nordmark, and EA Starke, 'Selection Aluminum Alloys to Resist Failure by Fracture Mechanisms', Fatigue and Fracture, vol. 19, ASM Handbook, ASM International, 1996, p. 771-812.*

(Continued)

*Primary Examiner* — Roy King
*Assistant Examiner* — Janelle Morillo
(74) *Attorney, Agent, or Firm* — Kilpatrick Townsend & Stockton, LLP (57) ABSTRACT

In a car body or component thereof with at least one first component of sheet metal of a first aluminum alloy and at least one second component of sheet metal of a second aluminum alloy, the first and second aluminum alloys are of type AlMgSi and in the sheet metal of the second aluminum alloy a substantial part of the elements Mg and Si, which are required to achieve artificial ageing in solid solution, is present in the form of separate $Mg_2Si$ and/or Si particles in order to avoid artificial ageing. By reduction of the hardening capacity of the second component during artificial ageing of the body as part of the paint baking cycle, the car body has an improved impact protection for pedestrians in comparison with solutions according to the prior art.

14 Claims, 4 Drawing Sheets (51) Int. Cl.
  *C22F 1/05* (2006.01)
  *B62D 25/08* (2006.01)
  *B62D 25/12* (2006.01)
  *C22C 21/04* (2006.01)

(52) U.S. Cl.
  CPC ............... *C22C 21/04* (2013.01); *C22C 21/08* (2013.01); *C22F 1/05* (2013.01); *Y10T 428/12764* (2015.01)

(56) References Cited

U.S. PATENT DOCUMENTS

| | | |
|---|---|---|
| 3,252,841 A | 5/1966 | Foerster |
| 3,816,190 A | 6/1974 | Warbichler et al. |
| 3,990,922 A | 11/1976 | Gullotti et al. |
| 4,082,578 A | 4/1978 | Evancho et al. |
| 4,525,326 A | 6/1985 | Schwellinger et al. |
| 5,141,703 A | 8/1992 | Schmid et al. |
| 5,266,130 A | 11/1993 | Uchida et al. |
| 5,303,763 A | 4/1994 | Aghajanian et al. |
| 5,616,189 A | 4/1997 | Jin et al. |
| 6,267,922 B1 | 7/2001 | Bull et al. |
| 6,652,678 B1 | 11/2003 | Marshall et al. |
| 6,780,259 B2 | 8/2004 | Bull et al. |
| 6,939,416 B2 | 9/2005 | Benedictus et al. |
| 6,994,760 B2 | 2/2006 | Benedictus et al. |
| 2002/0031682 A1 | 3/2002 | Dif et al. |
| 2003/0087122 A1 | 5/2003 | Benedictus et al. |
| 2003/0127165 A1 | 7/2003 | Magnusen et al. |
| 2004/0094249 A1* | 5/2004 | Uchida et al. ............ 148/693 |
| 2004/0238605 A1 | 12/2004 | Nishimura et al. |
| 2004/0250928 A1 | 12/2004 | Bull et al. |
| 2005/0028894 A1 | 2/2005 | Hoffmann et al. |
| 2007/0039669 A1 | 2/2007 | Reiso et al. |
| 2007/0137738 A1 | 6/2007 | Bassi et al. |
| 2009/0165901 A1 | 7/2009 | Koshigoe et al. |
| 2009/0202860 A1 | 8/2009 | Lahaije |
| 2011/0165437 A1 | 7/2011 | Timm et al. |

FOREIGN PATENT DOCUMENTS

| | | |
|---|---|---|
| DE | 69410344 | 4/2003 |
| EP | 623462 | 11/1994 |
| EP | 811700 | 12/1997 |
| EP | 997547 | 5/2000 |
| EP | 1170118 | 1/2002 |
| EP | 1533394 | 5/2005 |
| EP | 1852250 | 11/2007 |
| EP | 1392877 | 8/2011 |
| FR | 2900664 | 11/2007 |
| FR | 2922222 | 4/2009 |
| JP | 09067659 | 3/1997 |
| JP | 2000129382 | 5/2000 |
| MX | 297132 | 10/2014 |
| WO | 0052216 | 9/2000 |
| WO | 0224371 | 3/2002 |
| WO | 02090609 | 11/2002 |
| WO | 03006697 | 1/2003 |
| WO | 03010348 | 2/2003 |
| WO | 04001086 | 12/2003 |
| WO | 2007128391 | 11/2007 |

OTHER PUBLICATIONS

ASTM E290-09, "Standard Test Methods for Bend Testing of Material for Ductility", 10 pages.
"Aluminum and Aluminum Alloys", ASM International, 1993, 319 Pages.
"Machine Translation of JP 2000-129382 A (Kobe Steel, May 9, 2000)".
Office Action dated Feb. 4, 2013 in U.S. Appl. No. 13/055,910, 9 Pages.
Aluminum Association, "International Alloy Designation and Chemical Composition Limits for Wrought Aluminum and Wrought Aluminum Alloys", 2009, 36 pages.
Aluminum-Verlag, "Aluminum Taschenbuch 1", Dec. 2002, pp. 682-683.
Comalco, "The Selection, Processing and Application of 6000 Series Aluminium Extrusion Alloys", Technical Report No. 6, Sep. 2001.
Develay, "Traitements de mis en solution, trempe, maturation, revenu, ou traitement de durcissement structural", Techniques de l'Ingenieur, Paris, XP008032501, 1993, pp. 1-20.
Furrer, "Neue Aluminium-Blechwerkstoffe fur den Karosseriebau", Werkstoffsymposium Fahrzeugtechnik, Jun. 5, 2007, 29 pages.
Hufnagel, "4 Keys to Aluminium Alloys", 4th Edition, 1992, pp. 195-205.
Napalkov et al., "Continuous Casting of Aluminum Alloys", Moscow: Internet Engineering, 2005, p. 501.
Ostermann, "Anwendungstechnologie Aluminium", 2, neu bearbeitete und aktualisierte Auflage, 2007, p. 150.
Develay, "Traitements de mis en solution, trempe, maturation, revenu, ou traitement de durcissement structural", Techniques de l'Ingenieur, Paris, XP008032501, 1993, pp. 1-20.
Belov, Nikolay A., et al., "Chapter 2: Alloys of the Al—Mg—Si—Fe System," Multicomponent Phase Diagrams: Applications for Commercial Aluminum Alloys, Jul. 2005, pp. 47-82, Elsevier.
European Patent Application No. EP 04 798 037.0, Office Action mailed Feb. 21, 2014, 4 pages.

\* cited by examiner

AUTOMOBILE BODY PART

CROSS REFERENCE TO RELATED APPLICATIONS

This application is a continuation of U.S. patent application Ser. No. 13/467,328 filed May 9, 2012, now U.S. Pat. No. 9,085,328 which is a divisional application of U.S. patent application Ser. No. 12/703,538 filed Feb. 10, 2010, now abandoned, and is also a continuation application of U.S. patent application Ser. No. 10/578,985 filed May 11, 2006, now abandoned, which is a National Phase Application of International Application No. PCT/EP2004/013233 filed Nov. 22, 2004, which claims priority to European Patent Application 03405826 filed Nov. 20, 2003, now withdrawn, each of which is incorporated herein by reference in its entirety.

BACKGROUND OF THE INVENTION

The invention concerns a car body part of sheet metal of an aluminum alloy type AlMgSi, and a car body or component of a car body with at least one first component of sheet metal of the first aluminum alloy and at least one second component of sheet metal of a second aluminum alloy, where the first and second aluminum alloys are of type AlMgSi, and after artificial ageing of the body or body part, the second component in comparison with the first component has lower mechanical strength values.

For car body parts, car bodies or components of car bodies, artificial ageing takes place for example under the annealing conditions during paint baking or in a separately performed heat treatment.

The growing importance of the production of lighter cars with the purpose of energy saving has led to the development of a large number of aluminum alloys for car applications.

Different components in a car usually require different properties. For example, an aluminum alloy for outer panel applications must be easily deformable in order to allow stretch drawing, deep drawing and bending, and at the same time achieve a high strength after paint baking.

In Europe, for outer panel applications in particular for engine bonnets, already AlMgSi alloys are used, e.g. the alloy AA 6016, to a fairly great extent.

In particular, with regard to scrap metal reuse and recyclability, it would be particularly advantageous and suitable if for all aluminum panel applications in the body, aluminum alloys could be used which belong to the same family of alloys. U.S. Pat. No. 4,082,578 and EP-A-0 811 700 disclose aluminum alloys of type AlMgSi for inner and outer panel applications in car bodies.

Aluminum alloys in the structural area of a vehicle improve the driving behavior (vehicle rigidity, axle load distribution, center of gravity etc.). Such constructions can also have a high energy absorption capacity in the event of a crash. EP-A-1 165 848 discloses structural components made of sheet metal from an AlMgSi alloy.

In particular in Europe, the reduction of injury risk in car accidents has high priority. Due to improvements in car safety, this objective has been achieved very effectively. So far, however, very little has been done to reduce the severity of injuries to pedestrians and motorcyclists who hit the front of a car in an accident. Substantial improvements can be achieved by constructing the front parts of cars with corresponding energy absorption behavior.

Pedestrian protection measures on car bodies can be very effective in preventing serious and fatal injuries from collisions in the medium speed range. In most traffic accidents with pedestrians, a car collides frontally with the victim. The injury to the pedestrian is only partly caused by the initial impact. In many cases the pedestrian's torso bends and his head hits the bonnet.

Most head injuries are caused in adults by the upper end and in children by the front part, of the engine bonnet. The front edge of the bonnet is particularly critical in relation to injuries in the thigh or hip area. Detailed changes in the panel construction of the bonnet edge are necessary to reduce the rigidity and create sufficient crumple depth. This can be achieved by weakening or taking back the inner panel reinforcements on the bonnet, the bonnet closure and the closure cross braces.

By various active and passive measures, front panels and other large area body elements of cars have been made "softer". Here, the components are designed or actively modified so that in an impact they can absorb a large part of the kinetic energy by plastic deformation. These measures lead to fewer serious injuries.

Passive measures include the design, construction and material. In relation to the material, various material compounds are known e.g. sandwich constructions with foam materials. So far, however, no tests have been undertaken on the use of relatively soft aluminum alloys.

SUMMARY OF THE INVENTION

The invention is based on the object of creating a car body part and car body or component of a car body of the type cited initially which, as well as the common recycling of process scrap in the production of the various components, and simple scrap recycling of the body part in the end of life vehicle, leads to improved impact protection for pedestrians in comparison with solutions according to the prior art.

In relation to the single skin car body part, the object is achieved according to the invention by the presence in the sheet metal of a substantial part of the elements Mg and Si, which are required to achieve artificial ageing in solid solution, in the form of separate $Mg_2Si$ and/or Si particles in order to avoid artificial ageing.

In relation to the multi-skin car body or components of a car body produced from an outer and an inner part, the object is achieved according to the invention by the presence, at least in the sheet metal of the second aluminum alloy before artificial ageing of the body or body part, of a substantial part of the elements Mg and Si, which are required to achieve artificial ageing in solid solution, in the form of separate $Mg_2Si$ and/or Si particles in order to avoid artificial ageing.

The essential core of the invention lies in the use of "soft" components with a prespecified structure, so that—in contrast to "hard" components—under the normal paint baking conditions no or a decreased artificial ageing, respectively, occurs and consequently there is no further or a decreased increase, respectively, in the chemical strength values, but the soft components retain the values previously set by the prespecified structure or do not reach the maximum possible strength level during artificial ageing.

As a hard first aluminum alloy, an alloy is preferred which contains 0.6 to 1.2 wt. % silicon
0.3 to 0.8 wt. % magnesium
max. 0.8 wt. % copper
max. 0.4 wt. % iron
max. 0.3 wt. % manganese
max. 0.2 wt. % vanadium and production-related contaminants and aluminum as the remainder.

The hard first aluminum alloy comprises in particular the usual body outer skin materials e.g. AA 6016 and AA 6111.

In principle as a soft second aluminum alloy, an alloy identical to the first hard aluminum alloy is used, but in general a composition is preferred with a substantially lower strength level.

As a soft second aluminum alloy an alloy is preferred which contains
- 0.25 to 0.60 wt. % silicon
- 0.25 to 0.60 wt. % magnesium
- 0.05 to 0.30 wt. % copper
- max. 0.40 wt. % iron
- max. 0.30 wt. % manganese
- max. 0.20 wt. % vanadium and production-related contaminants, individually max. 0.05 wt. %, in total max. 0.15 wt. %, and aluminum as the remainder.

For the individual alloy elements of the second aluminum alloy, the following preferred content ranges apply:
- 0.30 to 0.50 wt. % silicon
- 0.30 to 0.50 wt. % magnesium
- max. 0.20 wt. % copper
- 0.05 to 0.20 wt. % iron
- max. 0.10 wt. % manganese
- max. 0.15 wt. % vanadium.

The desired strength or softness of the soft second component is set mainly by way of the Mg and Si content of the second aluminum alloy in combination with heat treatment of the sheets produced from the alloy before their shaping into the second components. Heat treatment ensures that the desired low mechanical strength values of the soft second component are substantially unchanged or may only reach a strength level being higher but lying below the maximum possible values, respectively, even after performance of a paint baking cycle on the car body. Depending on performance, the heat treatment causes:

precipitation of a substantial part of the alloy elements Mg and Si from the solid solution in the form of Si and $Mg_2Si$ particles and their coarsening so that the said alloy elements are no longer available in is entirety for the subsequent artificial ageing, and/or prevention of redissolution of the separated $Mg_2Si$ and Si particles so that the alloy elements Mg and Si are also no longer available in its entirety for further ageing during subsequent artificial ageing during a subsequent paint baking cycle.

It is also conceivable to use, instead of a "hard" first component, a "soft" one, i.e., a component which cannot be artificially aged, and to adjust the different strength values of the first and second components by way of the concentration of the alloy elements Mg and Si.

"Soft" panels, or sheets of the second aluminum alloy, can be produced in a conventional manner by way of continuous or strip casting with subsequent hot and/or cold rolling, with or without intermediate annealing.

With the conventional manufacturing process of car body sheet from AlMgSi materials attention is paid that alloy elements which are relevant for the precipitation are practically completely in solid solution after solution heat treatment or before artificial ageing, respectively, and only a part which is unavoidable with the selected manufacturing process and which may be designated as unessential at best is present in precipitated form.

The car body sheet according to the invention differs from this. The part of alloy elements which are relevant for precipitation which are present in precipitated form after solution heat treatment or before artificial ageing, respectively, causes a change of the mechanical strength values which lies outside the deviations from a given nominal value lying within the scope of manufacturing tolerances with a conventional production process. The part of the alloy elements which are relevant for precipitation which are present in precipitated form is therefore to be designated as substantial.

The desired precipitation state of the alloy elements Mg and Si in the sheets of the second aluminum alloy can be achieved in various ways which are already known. Preferred process stages which deviate from the conventional production procedure of AlMgSi body materials and lead to the desired pre-separation of the alloy elements Mg and Si which are relevant for artificial ageing, include the following steps which can be performed individually or in combination:

No homogenization annealing of the casting bar, merely heating to hot rolling temperature and immediate hot rolling.

Performance of a "partial solution annealing" on the sheet, rolled to the final thickness, for a short period at relatively low temperature with continuous annealing in a strip passage oven at a temperature range from around 450° to 520° C. for max. 30 seconds, where applicable using mild cooling conditions.

Performance of a "partial heterogenisation" annealing of the sheet, rolled to the final thickness, with annealing of coils in a chamber oven with a retention time from 1 to 4 h in a temperature range from around 330° C. to 400° C.

In principle the second aluminum alloy is selected primarily on the basis of a prespecified strength. The temperature and duration of performance of the above-mentioned annealing which is necessary to achieve a structure state which does not lead to a further or only to a defined limited rise, respectively, in the mechanical strength values on subsequent artificial ageing, are determined for each alloy or application individually from a simple test series.

The lowest strength level results if the part of alloy elements present in solid solution and contributing to artificial ageing is so small that it is to be neglected. For example, in case a specification for a car body part made from sheet requires a defined strength level lying above the minimum strength level for a given alloy composition, the strength level can be adapted with the same alloy composition by selecting a higher part of alloy elements present in solid solution and contributing to artificial ageing or controlling the artificial ageing treatment that only a small part is precipitated as $Mg_2Si$ and/or Si particles, respectively. The car body part is then somewhat less "soft" in favor of a higher strength.

Preferably, the soft second components are inner panels of a body element, in particular a bonnet, and trim parts or structural components or reinforcing elements arranged in the front area of the body. The soft second components can however also be body elements which in conventional car bodies are formed from hard first components. A substantial area of use of the soft second component is hence deep-drawn body parts with good bending behavior.

A soft component can for example be used as an inner panel of a steel or plastic bonnet, a trim part in the front area of a car (e.g. radiator grille, bumper cover, spoiler etc.) or a structural component or reinforcement panel in the frontal area (e.g. reinforcement panel in the bonnet closure area, support panels for radiator, headlights and other assemblies in the front area etc.).

A further application which is not known in this manner in body construction can also be "curtain-type" protective panels. In this case the improved bending behavior which is achieved is particularly important as, on an impact, it prevents cracking or splintering in the folds, further minimizing the risk of injury.

Further advantages, features and details of the invention arise from the description below of preferred embodiment examples and with reference to the accompanying drawings.

DETAILED DESCRIPTION

Example 1

From a first aluminum alloy A (AA 6016) and a second aluminum alloy B with the chemical compositions given in table 1, strips of thickness 1.2 mm were produced in a conventional manner by vertical continuous casting, homogenization annealing, hot and cold rolling.

TABLE 1

| Alloy | Si | Fe | Cu | Mr | Mg | Cr | Zn | Ti | V |
|---|---|---|---|---|---|---|---|---|---|
| A | 1.14 | 0.21 | 0.08 | 0.07 | 0.55 | 0.013 | 0.003 | 0.033 | <0.005 |
| B | 0.42 | 0.17 | 0.08 | 0.07 | 0.40 | 0.018 | <0.003 | 0.024 | 0.006 |

The strips were subjected to solution annealing (alloy A) and partial solution annealing (alloy B) in a strip passage annealing oven, then quenched by moving air and artificially aged for several days at room temperature to delivery state T4. For the two aluminum alloys A and B the following solution annealing conditions were selected:

Alloy A 550° C./30 seconds
Alloy B 500° C./20 seconds

A paint baking cycle was simulated on sheet samples of aluminum alloys A and B in delivery state T4, with annealing at a temperature of 185° C. for a period of 20 min. To test the influence of cold forming (CF) on the yield strength $R_{p0.2}$, tensile strength $R_m$ and elongation at fracture $A_{80}$, the sheet samples in delivery state were 2% further cold formed. A further series of specimens were 2% cold formed in delivery state and then subjected to the above-mentioned annealing treatment.

Figure 1:
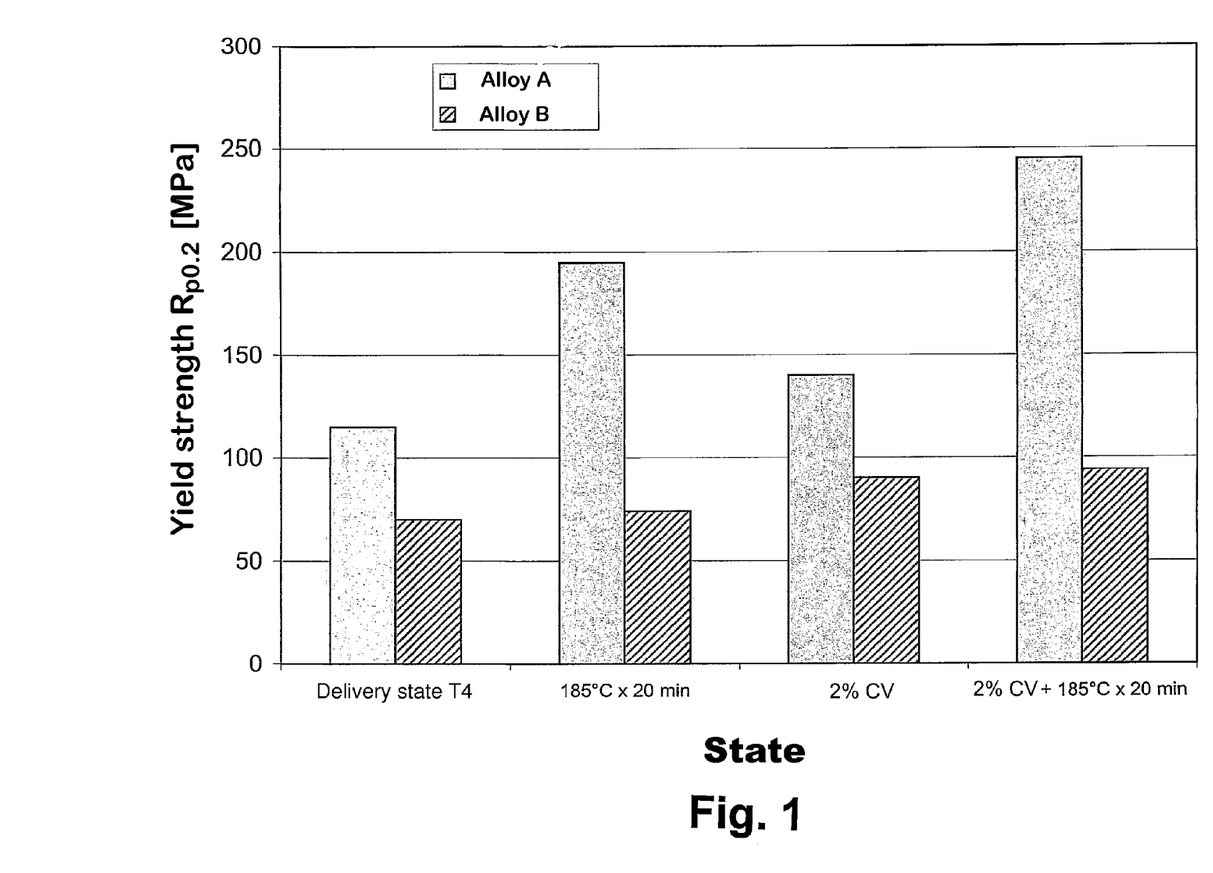
FIG. 1 is a diagram with the yield strength of a first and a second aluminum alloy in different ageing states.
Figure 2:
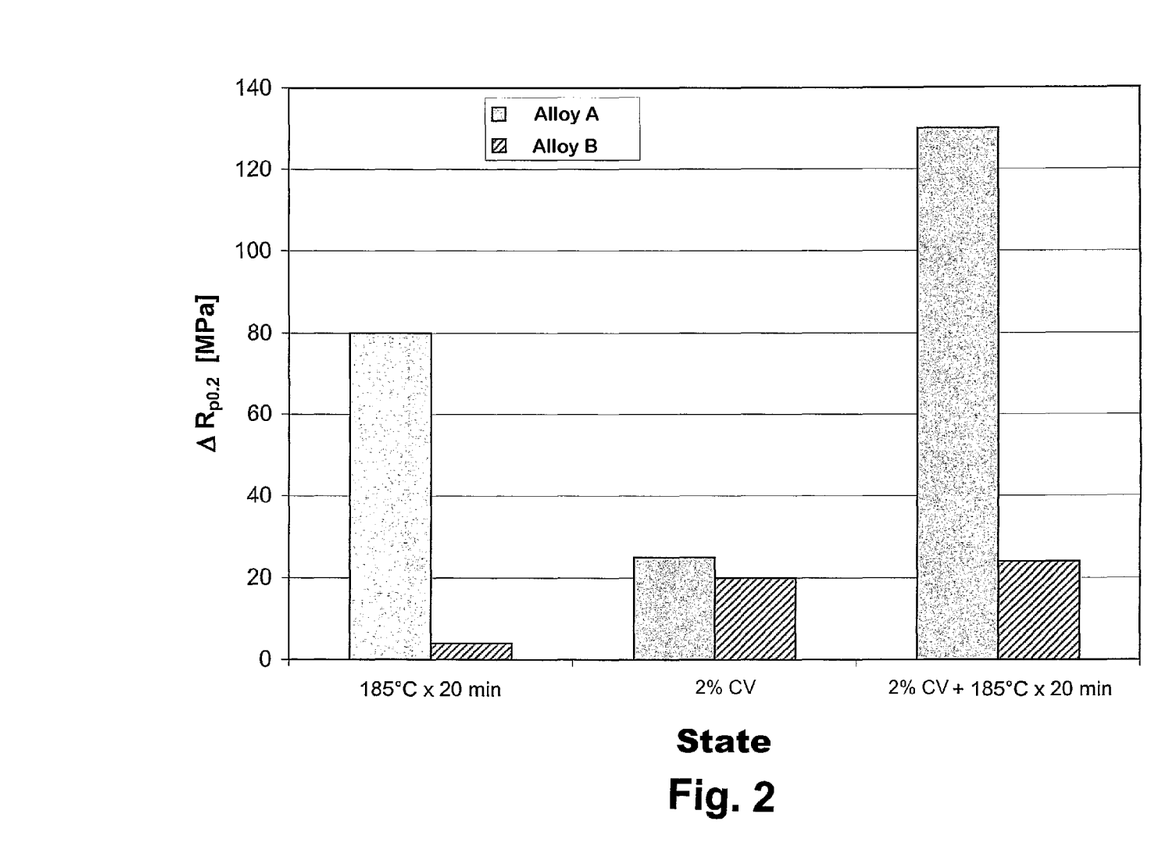
FIG. 2 is a diagram with the differences between the yield strength of the first and second aluminum alloys of FIG. 1 in different ageing states and the yield strength of the alloys in delivery state T4.

The mechanical strength values given in Table 2 for the two aluminum alloys A and B in the various states tested, and the values also shown graphically in FIGS. 1 and 2 for the yield strength $R_{p0.2}$, for both aluminum alloys A and B in delivery state with 2% cold forming, show a slight and proportionally approximately equal increase in yield strength. If merely a paint baking annealing is performed at the delivery state, for alloy A there is a clear increase in the yield strength whereas for alloy B there is practically no artificial ageing effect. The differing behavior of the two aluminum alloys A and B under paint baking conditions is even clearer under combined application of cold forming 2% with subsequent annealing at 185° C. for 20 minutes, as often occurs in practice in the production of car body parts.

TABLE 2

| Alloy | State | $R_{p0.2}$ [MPa] | $R_m$ [MPa] | $A_{80}$ [%] | $\Delta R_{p0.2}$ [MPa] |
|---|---|---|---|---|---|
| A | A Delivery state T4 | 115 | 225 | 25.4 | |
| | 185° C. × 20 min | 195 | 271 | 20.8 | 80 |
| | 2% CF | 140 | 251 | 24.3 | 25 |
| | 2% CF + 185° C. × 20 min | 245 | 295 | 15.4 | 130 |
| B | A Delivery state T4 | 70 | 129 | 27.7 | |
| | 185° C. × 20 min | 74 | 130 | 25.9 | 4 |
| | 2% CF | 90 | 133 | 25.3 | 20 |
| | 2% CF + 185° C. × 20 min | 94 | 149 | 18.6 | 24 |

Example 2

On 2 tensile test pieces of alloy B in Example 1 having a thickness of 0.85 mm and a width of 12.5 mm in different artificial ageing conditions tensile strength $R_m$, yield strength $R_{p0.2}$ and elongation at fracture $A_{50}$ have been determined in tensile tests. The examined artificial ageing treatments are given in Table 3. The solution annealing was carried out in a salt bath at the given temperature for the given time. Subsequently the test pieces were quenched in water, aged for 24 h at room temperature and subsequently aged for 24 h at a temperature of 65° C. This ageing treatment leads to a simulated T4 condition. A part of these test pieces A to L was given an artificial ageing treatment at 205° C. for 1 h, corresponding to a T6 condition.

TABLE 3

| Test Piece | Solution annealing |
|---|---|
| A | 520° c./5 s |
| B | 520° c./10 s |
| C | 530° c./0 s |
| D | 530° c./5 s |
| E | 530° c./10 s |
| F | 530° c./20 s |
| G | 540° c./0 s |
| H | 540° c./5 s |
| I | 540° c./10 s |
| J | 540° c./20 s |
| K | 540° c./60 s |
| L | 540° c./10 min |

The results of tensile tests carried out on 2 test pieces each are given in Table 4 for the test pieces in the T4 condition and in Table 5 for the test pieces in the T6 condition.

TABLE 4

| Test piece | $R_{p0.2}$ [MPa] | $R_m$ [MPa] | $A_{50}$ [%] |
|---|---|---|---|
| A1 | 43.9 | 115.6 | 16.3 |
| A2 | 44.6 | 114.5 | 23.3 |
| B1 | 43.9 | 114.9 | 20.2 |
| B2 | 44.2 | 117.3 | 23.2 |
| C1 | 44.1 | 116.4 | 24.2 |
| C2 | 40.6 | 112.9 | 26.8 |
| D1 | 45.2 | 114.8 | 30.9 |
| D2 | 43.6 | 116.0 | 22.0 |
| E1 | 44.0 | 119.5 | 15.6 |
| E2 | 45.3 | 117.2 | 25.5 |
| F1 | 48.5 | 125.2 | 19.0 |
| F2 | 48.4 | 124.9 | 26.6 |

TABLE 4-continued

| Test piece | $R_{p0.2}$ [MPa] | $R_m$ [MPa] | $A_{50}$ [%] |
|---|---|---|---|
| G1 | 41.5 | 112.1 | 26.1 |
| G2 | 42.9 | 111.1 | 25.1 |
| H1 | 43.7 | 115.3 | 25.1 |
| H2 | 43.9 | 114.0 | 20.2 |
| I1 | 44.0 | 119.0 | 21.7 |
| I2 | 45.3 | 118.7 | 24.9 |
| J1 | 48.3 | 127.6 | 15.1 |
| J2 | 47.6 | 126.1 | 24.4 |
| K1 | 56.8 | 137.8 | 15.6 |
| K2 | 56.4 | 137.9 | 16.2 |
| L1 | 63.1 | 152.4 | 20.7 |
| L2 | 61.7 | 144.1 | 18.1 |

TABLE 5

| Test piece | $R_{p0.2}$ [MPa] | $R_m$ [MPa] | $A_{50}$ [%] |
|---|---|---|---|
| A1 | 47.1 | 117.2 | 25.1 |
| A2 | 46.5 | 116.1 | 21.6 |
| B1 | 52.5 | 119.9 | 24.8 |
| B2 | 54.3 | 123.4 | 25.3 |
| C1 | 40.9 | 111.0 | 26.1 |
| C2 | 41.4 | 111.2 | 27.9 |
| D1 | 49.9 | 119.6 | 24.4 |
| D2 | 53.2 | 120.4 | 25.2 |
| E1 | 50.6 | 121.4 | 25.3 |
| E2 | 57.2 | 123.5 | 23.9 |
| F1 | 61.5 | 130.9 | 24.7 |
| F2 | 61.7 | 129.1 | 22.9 |
| G1 | 44.7 | 114.1 | 28.1 |
| G2 | 44.0 | 113.3 | 26.5 |
| H1 | 45.4 | 119.9 | 20.5 |
| H2 | 47.5 | 118.4 | 19.2 |
| I1 | 55.6 | 125.7 | 25.0 |
| I2 | 52.6 | 124.5 | 25.4 |
| J1 | 65.9 | 135.1 | 18.5 |
| J2 | 64.5 | 135.1 | 18.9 |
| K1 | 98.3 | 154.6 | 10.6 |
| K2 | 98.2 | 153.5 | 11.3 |
| L1 | 138.4 | 177.3 | 9.0 |
| L2 | 137.4 | 178.0 | 11.4 |

From the test pieces C and L in table 4 metal cuts have been made. Under a scanning electron microscope in the compo modus the volume part of the precipitated Mg$_2$Si particles related to the total volume has been determined by measuring the corresponding area parts in 12 area regions. Particles having a diameter ≥0.1 µm are designated as precipitated Mg$_2$Si particles.

The mean values for the test piece C resulted in a volume part of 0.444.+−.0.077% corresponding to apart of about 50% of the theoretically possible Volume part. For the test piece L the mean values resulted in a volume part of 0.071.+−.0.029% corresponding to a part of about 8% of the theoretically possible volume part.

Figure 3:
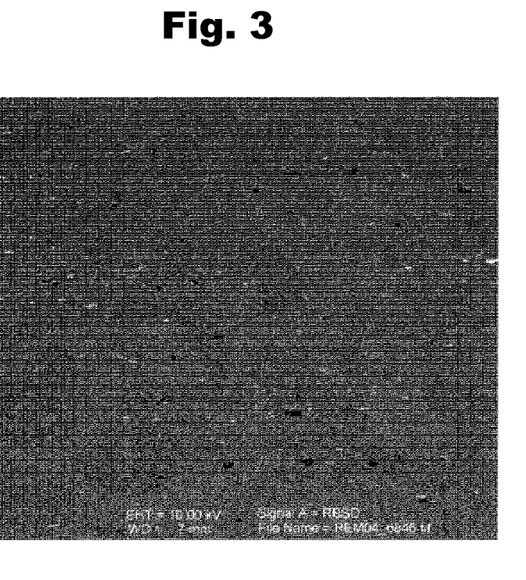
FIGS. 3 and 4 are pictures taken from metal cuts of sheet samples with different part of precipitated $Mg_2Si$ particles under a scanning electron microscope (SEM) in compo modus.
Figure 4:
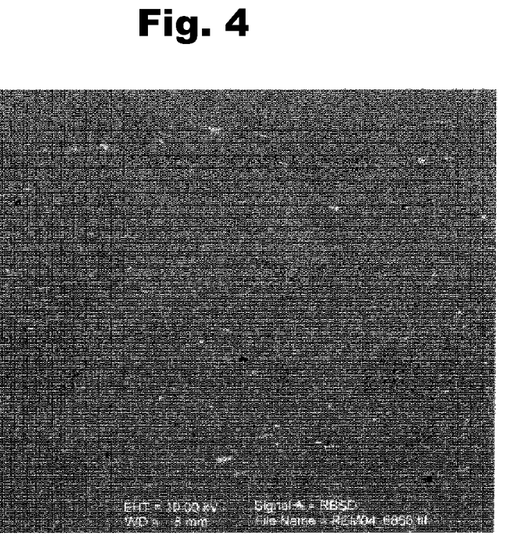

The SEM picture in compo modus of test piece C shown in FIG. 3 and of test piece L shown in FIG. 4 let the heavy iron containing precipitates appear as bright spots and the lightweight Mg$_2$Si particles as dark spots. The higher volume part of precipitated Mg$_2$Si particles of test piece C in comparison with test piece L is clearly perceptible.

Figure 5:
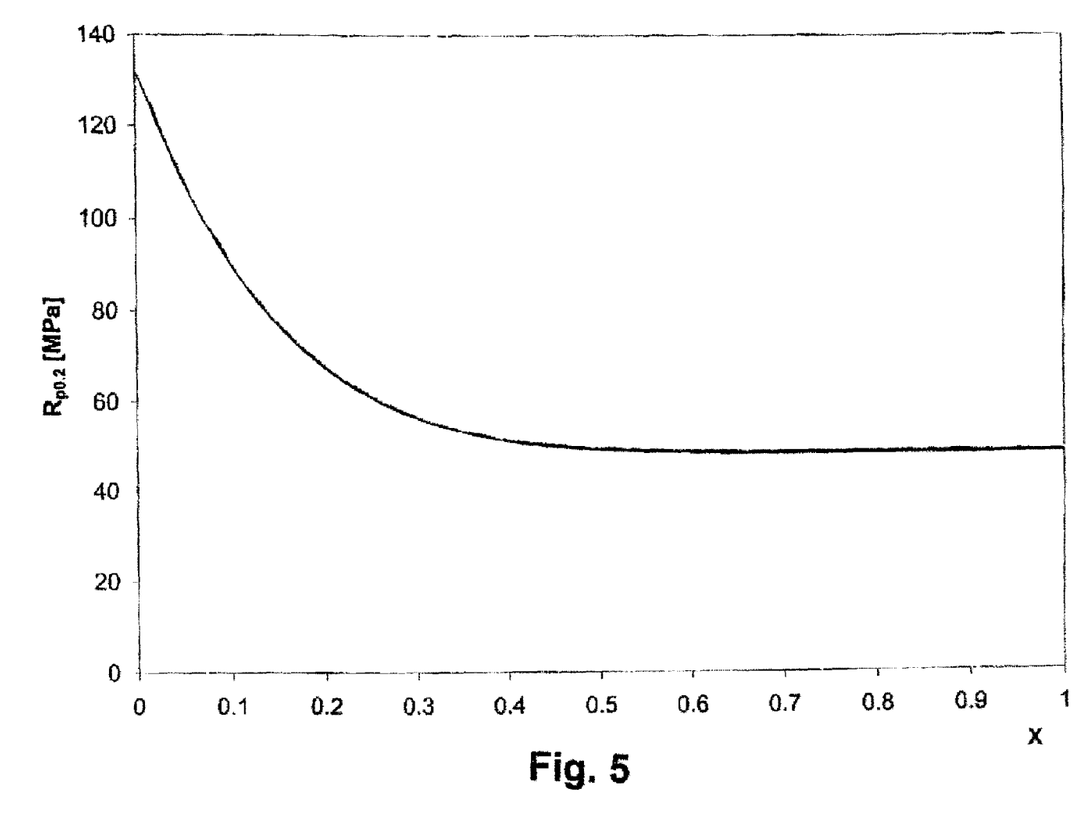
FIG. 5 shows the dependence of the yield strength on the volume part of precipitated $Mg_2Si$ particles of an AlMgSi alloy by means of a model calculation.

With the values for the yield strength $R_{p0.2}$ measured on the test pieces A to L of Table 5 the dependence of the yield strength $R_{p0.2}$ on the volume part of the precipitated Mg$_2$Si particles has been determined by means of a model calculation and is graphically shown in FIG. 5. The values on the x-axis correspond to the ratio of the volume part of the Mg$_2$Si pre-precipitates to the theoretically possible volume part.

The diagram clearly shows that the yield strength $R_{p0.2}$ selected here as a measure for the "softness" of the alloy can be varied within broad limits by controlling the pre-precipitation of Mg$_2$Si.

The invention claimed is:

1. A sheet metal AlMgSi type aluminum alloy, wherein at least 40% of the elements Mg and Si in the sheet metal, which are required to achieve artificial ageing in solid solution, are present as separate Mg$_2$Si and/or Si particles that are no longer available for subsequent artificial ageing and wherein the sheet metal has a yield strength of 60 MPa or less.

2. The aluminum alloy of claim 1, wherein the aluminum alloy comprises:
   0.30 to 0.50 weight percent silicon;
   0.30 to 0.50 weight percent magnesium;
   max. 0.20 weight percent copper;
   0.05 to 0.20 weight percent iron,
   max. 0.10 weight percent manganese;
   max. 0.15 weight percent vanadium;
   with production-related contaminants, individually a maximum of 0.05 weight percent, total maximum of 0.15 weight percent, and aluminum as the remainder.

3. The automobile body part aluminum alloy of claim 2, wherein vanadium is 0 weight percent.

4. The aluminum alloy of claim 1, wherein the aluminum alloy is an automobile body part, wherein the automobile body part is a bonnet, an inner panel of a body part, in particular a hood, or a trim part, a structural component or a reinforcing element in the front part of an automobile body.

5. The aluminum alloy of claim 2, wherein the aluminum alloy is an automobile body part, wherein the automobile body part is a bonnet, an inner panel of a body part, in particular a hood, or a trim part, a structural component or a reinforcing element in the front part of an automobile body.

6. The aluminum alloy of claim 2, wherein the aluminum alloy is an automobile body part, wherein the automobile body part is a deep-drawn body part with good bending behavior.

7. An automobile body or body component comprising at least a first sheet metal component of a first aluminum alloy (A) and at least a second sheet metal component of a second aluminum alloy (B), whereby the first and second aluminum alloys are AlMgSi type aluminum alloys and, after artificial ageing of the body or body component, the second sheet metal component has a lower mechanical strength than the first sheet metal component, wherein at least in the sheet metal of the second aluminum alloy (B), at least 40% of the elements Mg and Si, which are required to achieve artificial ageing in solid solution, are present as separate Mg$_2$Si and/or Si particles that are no longer available for subsequent artificial ageing and wherein the sheet metal of the second aluminum alloy (B) has a yield strength of 60 MPa or less.

8. The automobile body or body component of claim 7, wherein the second aluminum alloy component (B) comprises:
   0.30 to 0.50 weight percent silicon;
   0.30 to 0.50 weight percent magnesium;
   max. 0.20 weight percent copper;
   0.05 to 0.20 weight percent iron,
   max. 0.10 weight percent manganese;
   max. 0.15 weight percent vanadium;
   with production-related contaminants, individually a maximum of 0.05 weight percent, total maximum of 0.15 weight percent, and aluminum as the remainder.

9. The automobile body or body component of claim 8, wherein vanadium is 0 weight percent.

10. The automobile body or body component of claim 7, wherein the second sheet metal component is a bonnet, an inner panel of a body part, in particular a hood, or a trim part, a structural component or a reinforcing element in the front part of an automobile body.

11. The automobile body or body component thereof according of claim 7, wherein the second sheet metal component is a deep-drawn body part with good bending behavior.

12. A sheet metal AlMgSi type aluminum alloy comprising:
  0.30 to 0.50 weight percent silicon;
  0.30 to 0.50 weight percent magnesium;
  max. 0.20 weight percent copper;
  0.05 to 0.20 weight percent iron,
  max. 0.10 weight percent manganese;
  max. 0.15 weight percent vanadium;
  with production-related contaminants, individually a maximum of 0.05 weight percent, total maximum of 0.15 weight percent, and aluminum as the remainder,
  wherein at least 40% of the elements Mg and Si in the sheet metal are present as separate $Mg_2Si$ and/or Si particles that are no longer available for subsequent artificial ageing and wherein the sheet metal has a yield strength of 60 MPa or less.

13. The alloy of claim 12, wherein vanadium is 0 weight percent.

14. A sheet metal AlMgSi type aluminum alloy, wherein at least 40% of the elements Mg and Si in the sheet metal, which are required to achieve artificial ageing in solid solution, are present as separate $Mg_2Si$ and/or Si particles that are no longer available for subsequent artificial ageing and wherein the sheet metal has a yield strength of 60 MPa or less.

* * * * *